(12) United States Patent
Okuno et al.

(10) Patent No.: US 6,511,394 B2
(45) Date of Patent: Jan. 28, 2003

(54) POWER TRANSMISSION BELT

(75) Inventors: Shigeki Okuno, Hyogo (JP); Katsuyoshi Fujiwara, Hyogo (JP)

(73) Assignee: Bando Chemical Industries, Ltd., Hyogo (JP)

( * ) Notice: Subject to any disclaimer, the term of this patent is extended or adjusted under 35 U.S.C. 154(b) by 12 days.

(21) Appl. No.: 09/942,861

(22) Filed: Aug. 31, 2001

(65) Prior Publication Data

US 2002/0032091 A1 Mar. 14, 2002

(30) Foreign Application Priority Data

Sep. 8, 2000 (JP) .................................. 2000-272490

(51) Int. Cl.$^7$ ................................................. F16G 1/06
(52) U.S. Cl. .................. 474/260; 474/237; 525/191
(58) Field of Search ................... 474/202, 237, 474/260, 261, 263, 264; 525/191, 232, 240

(56) References Cited

U.S. PATENT DOCUMENTS

| 4,983,678 A | * | 1/1991 | Saito et al. ................. 525/193 |
| 5,610,217 A | * | 3/1997 | Yarnell et al. ............... 524/397 |
| 5,698,650 A | * | 12/1997 | Jourdain et al. ............. 526/283 |
| 5,853,849 A | * | 12/1998 | Nishio et al. ................ 428/143 |
| 5,904,630 A | * | 5/1999 | Berthelier .................... 474/263 |
| 6,287,230 B1 | * | 9/2001 | Okuno ......................... 474/237 |
| 6,464,607 B1 | * | 10/2002 | Rosenboom et al. ........ 474/263 |

* cited by examiner

Primary Examiner—David A. Bucci
Assistant Examiner—Timothy McAnulty
(74) Attorney, Agent, or Firm—Nixon Peabody LLP; Thomas W. Cole

(57) ABSTRACT

The belt body of a power transmission belt is composed of a rubber composition comprising ethylene-á-olefin elastomer as the raw material rubber. The ethylene-á-olefin elastomer as the raw material rubber comprises 7 to 12 mass % of a high molecular weight component having a molecular weight of $10^6$ or more and an ethylene content of 65 mass % or more, and 26 to 60 mass % of a low molecular weight component having a molecular weight of $10^5$ or less and an ethylene content of 60 mass % or less, and the ethylene-é-olefin elastomer has a Mooney viscosity of 50 $ML_{1+4}$ or less (100 C.).

5 Claims, 12 Drawing Sheets

FIG. 2

| | Raw material rubber properties | | | | |
|---|---|---|---|---|---|
| | Molecular weight distribution | | Mooney viscosity | Ethlene content (mass%) | ENB amount (mass%) |
| | High molecular weight component (mass%) | Low molecular weight component (mass%) | | | |
| polymer 1 | 14 | 14 | 90 | 67.0 | 5.5 |
| polymer 2 | 14 | 14 | 90 | 65.0 | 5.5 |
| polymer 3 | 14 | 14 | 90 | 63.0 | 5.5 |
| polymer 4 | 15 | 25 | 42 | 49.0 | 5.5 |
| polymer 5 | 0 | 100 | — | 40.7 | 9.5 |

Trilene67 manufactured by Uniroyal Chemical Company, Inc.

FIG. 3

| Blended chemicals | Product name | Manufacturer | Blending ratio |
|---|---|---|---|
| raw material rubber (EPDM) | — | — | 100.0 |
| zinc oxide | Zinc oxide category 3 | Sakai Chemical Industry Co., Ltd. | 5.0 |
| stearic acid | Stearic acid 50S | New Japan Chemical Co., Ltd. | 1.0 |
| carbon black | SEAST 3 | Tokai Carbon Co., Ltd. | variable |
| oil | Sumper 2280 | Kobe Oil Chemical Industrial Co., Ltd. | variable |
| antioxidant 1 | NOCRAC 224 | Ouchishinko Chemical Industrial Co., Ltd. | 2.0 |
| antioxidant 2 | NOCRAC MB | Ouchishinko Chemical Industrial Co., Ltd. | 1.0 |
| sulphur | Oil sulphur | Hosoi Chemical Industry Co., Ltd. | 1.5 |
| vulcanization accelerator 1 | NOCCELER TS | Ouchishinko Chemical Industrial Co., Ltd. | 1.5 |
| vulcanization accelerator 2 | NOCCELER M | Ouchishinko Chemical Industrial Co., Ltd. | 0.5 |
| nylon short fibers | Nylon 66 | ASAHI KASEI CORP. | 10.0 |

FIG. 8A

| | Polymer | Mixing ratio | Carbon black amount | Oil amount | Raw material rubber properties | | | | |
|---|---|---|---|---|---|---|---|---|---|
| | | | | | High molecular weight component amount (mass%) | Low molecular weight component amount (mass%) | Mooney viscosity | Ethylene content in high molecular weight component (mass%) | Ethylene content in low molecular weight component (mass%) |
| Ex.1 | polymer 1/polymer 5 | 100/0 | 50 | 10 | 14.0 | 14.0 | 90 | 67 | 67 |
| Ex.2 | polymer 1/polymer 5 | 90/10 | 50 | 10 | 12.6 | 22.6 | 65 | 67 | 55 |
| Ex.3 | polymer 1/polymer 5 | 80/20 | 50 | 10 | 11.2 | 31.2 | 43 | 67 | 50 |
| Ex.4 | polymer 1/polymer 5 | 70/30 | 50 | 10 | 9.8 | 39.8 | 19 | 67 | 47 |
| Ex.5 | polymer 1/polymer 5 | 60/40 | 50 | 10 | 8.4 | 48.4 | 10 or less | 67 | 45 |
| Ex.6 | polymer 1/polymer 5 | 50/50 | 50 | 10 | 7.0 | 57.0 | 10 or less | 67 | 44 |
| Ex.7 | polymer 1/polymer 5 | 40/60 | 50 | 10 | 5.6 | 65.6 | 10 or less | 67 | 45 |
| Ex.8 | polymer 2/polymer 5 | 100/0 | 50 | 10 | 14.0 | 14.0 | 90 | 65 | 65 |
| Ex.9 | polymer 2/polymer 5 | 90/10 | 50 | 10 | 12.6 | 22.6 | 65 | 65 | 54 |
| Ex.10 | polymer 2/polymer 5 | 80/20 | 50 | 10 | 11.2 | 31.2 | 43 | 65 | 49 |
| Ex.11 | polymer 2/polymer 5 | 70/30 | 50 | 10 | 9.8 | 39.8 | 19 | 65 | 47 |
| Ex.12 | polymer 2/polymer 5 | 60/40 | 50 | 10 | 8.4 | 48.4 | 10 or less | 65 | 45 |
| Ex.13 | polymer 2/polymer 5 | 50/50 | 50 | 10 | 7.0 | 57.0 | 10 or less | 65 | 44 |
| Ex.14 | polymer 2/polymer 5 | 40/60 | 50 | 10 | 5.6 | 65.6 | 10 or less | 65 | 43 |

FIG. 8B

| | Polymer | Mixing ratio | Carbon black amount | Oil amount | Raw material rubber properties ||||||
|---|---|---|---|---|---|---|---|---|---|
| | | | | | High molecular weight component amount (mass%) | Low molecular weight component amount (mass%) | Mooney viscosity | Ethylene content in high molecular weight component (mass%) | Ethylene content in low molecular weight component (mass%) |
| Ex.15 | polymer 3/polymer 5 | 100/0 | 50 | 10 | 14.0 | 14.0 | 90 | 63 | 63 |
| Ex.16 | polymer 3/polymer 5 | 90/10 | 50 | 10 | 12.6 | 22.6 | 65 | 63 | 53 |
| Ex.17 | polymer 3/polymer 5 | 80/20 | 50 | 10 | 11.2 | 31.2 | 43 | 63 | 49 |
| Ex.18 | polymer 3/polymer 5 | 70/30 | 50 | 10 | 9.8 | 39.8 | 19 | 63 | 46 |
| Ex.19 | polymer 3/polymer 5 | 60/40 | 50 | 10 | 8.4 | 48.4 | 10 or less | 63 | 45 |
| Ex.20 | polymer 3/polymer 5 | 50/50 | 50 | 10 | 7.0 | 57.0 | 10 or less | 63 | 43 |
| Ex.21 | polymer 1/polymer 4 | 100/0 | 50 | 10 | 14.0 | 14.0 | 90 | 67 | 67 |
| Ex.22 | polymer 1/polymer 4 | 90/10 | 50 | 10 | 14.1 | 15.1 | 80 | 65 | 64 |
| Ex.23 | polymer 1/polymer 4 | 80/20 | 50 | 10 | 14.2 | 16.2 | 74 | 63 | 61 |
| Ex.24 | polymer 1/polymer 4 | 70/30 | 50 | 10 | 14.3 | 17.3 | 65 | 61 | 59 |
| Ex.25 | polymer 1/polymer 4 | 60/40 | 50 | 10 | 14.4 | 18.4 | 60 | 60 | 57 |
| Ex.26 | polymer 1/polymer 4 | 50/50 | 50 | 10 | 14.5 | 19.5 | 56 | 58 | 55 |
| Ex.27 | polymer 1/polymer 4 | 30/70 | 50 | 10 | 14.7 | 21.7 | 48 | 54 | 52 |
| Ex.28 | polymer 1/polymer 4 | 0/100 | 50 | 10 | 15.0 | 25.0 | 42 | 49 | 49 |
| Ex.29 | polymer 1/polymer 5 | 100/0 | 100 | 30 | 14.0 | 14.0 | 90 | 67 | 67 |
| Ex.30 | polymer 1/polymer 5 | 90/10 | 100 | 30 | 12.6 | 22.6 | 65 | 67 | 55 |
| Ex.31 | polymer 2/polymer 5 | 100/0 | 100 | 30 | 14.0 | 14.0 | 90 | 65 | 65 |
| Ex.32 | polymer 2/polymer 5 | 90/10 | 100 | 30 | 12.6 | 22.6 | 65 | 65 | 54 |

FIG. 9A

| | Polymer | Mixing ratio | Processability of unvulcanized rubber composition | | |
|---|---|---|---|---|---|
| | | | Roll processability | Tacking ability between sheets during molding | Handling properties of rubber sheets |
| Ex.1 | polymer 1/polymer 5 | 100/0 | Poor | Poor | Good |
| Ex.2 | polymer 1/polymer 5 | 90/10 | Fair | Poor | Good |
| Ex.3 | polymer 1/polymer 5 | 80/20 | Good | Good | Good |
| Ex.4 | polymer 1/polymer 5 | 70/30 | Good | Good | Good |
| Ex.5 | polymer 1/polymer 5 | 60/40 | Good | Good | Good |
| Ex.6 | polymer 1/polymer 5 | 50/50 | Good | Good | Good |
| Ex.7 | polymer 1/polymer 5 | 40/60 | Poor | Good | Poor |
| Ex.8 | polymer 2/polymer 5 | 100/0 | Poor | Poor | Good |
| Ex.9 | polymer 2/polymer 5 | 90/10 | Fair | Poor | Good |
| Ex.10 | polymer 2/polymer 5 | 80/20 | Good | Good | Good |
| Ex.11 | polymer 2/polymer 5 | 70/30 | Good | Good | Good |
| Ex.12 | polymer 2/polymer 5 | 60/40 | Good | Good | Good |
| Ex.13 | polymer 2/polymer 5 | 50/50 | Good | Good | Good |
| Ex.14 | polymer 2/polymer 5 | 40/60 | Good | Good | Poor |

FIG. 9B

| | Polymer | Mixing ratio | Processability of unvulcanized rubber composition | | Handling properties of rubber sheets |
|---|---|---|---|---|---|
| | | | Roll processability | Tacking ability between sheets during molding | |
| Ex.15 | polymer 3/polymer 5 | 100/0 | Poor | Poor | Good |
| Ex.16 | polymer 3/polymer 5 | 90/10 | Fair | Poor | Good |
| Ex.17 | polymer 3/polymer 5 | 80/20 | Good | Good | Poor |
| Ex.18 | polymer 3/polymer 5 | 70/30 | Good | Good | Poor |
| Ex.19 | polymer 3/polymer 5 | 60/40 | Good | Good | Poor |
| Ex.20 | polymer 3/polymer 5 | 50/50 | Good | Good | Poor |
| Ex.21 | polymer 1/polymer 4 | 100/0 | Poor | Poor | Good |
| Ex.22 | polymer 1/polymer 4 | 90/10 | Poor | Poor | Good |
| Ex.23 | polymer 1/polymer 4 | 80/20 | Fair | Poor | Good |
| Ex.24 | polymer 1/polymer 4 | 70/30 | Fair | Poor | Good |
| Ex.25 | polymer 1/polymer 4 | 60/40 | Good | Good | Good |
| Ex.26 | polymer 1/polymer 4 | 50/50 | Good | Good | Poor |
| Ex.27 | polymer 1/polymer 4 | 30/70 | Good | Good | Poor |
| Ex.28 | polymer 1/polymer 4 | 0/100 | Good | Good | Good |
| Ex.29 | polymer 1/polymer 5 | 100/0 | Good | Good | Good |
| Ex.30 | polymer 1/polymer 5 | 90/10 | Good | Good | Good |
| Ex.31 | polymer 2/polymer 5 | 100/0 | Good | Good | Good |
| Ex.32 | polymer 2/polymer 5 | 90/10 | Good | Good | Good |

FIG. 10A

| | Polymer | Mixing ratio | Belt characteristics | | | | | | |
|---|---|---|---|---|---|---|---|---|---|
| | | | Crack occurrence life (hours) | Low temperature running crack occurrence cycle (cycles) | Relative short fiber length (%) | Abration loss (%) | Abration due to adhesion (%) | Noise during running | Tooth part shear strength retention rate (%) |
| Ex.1 | polymer 1/polymer 5 | 100/0 | 552 | 1524 | 45 | 2.5 | No adhesion | 0.91 | 48 |
| Ex.2 | polymer 1/polymer 5 | 90/10 | 533 | 2163 | 50 | 2.1 | No adhesion | 0.90 | 59 |
| Ex.3 | polymer 1/polymer 5 | 80/20 | 512 | 4236 | 55 | 1.5 | No adhesion | 0.84 | 70 |
| Ex.4 | polymer 1/polymer 5 | 70/30 | 498 | 5000 or more | 59 | 1.4 | No adhesion | 0.82 | 71 |
| Ex.5 | polymer 1/polymer 5 | 60/40 | 490 | 5000 or more | 65 | 1.2 | No adhesion | 0.80 | 73 |
| Ex.6 | polymer 1/polymer 5 | 50/50 | 481 | 5000 or more | 71 | 1.0 | No adhesion | 0.78 | 74 |
| Ex.7 | polymer 1/polymer 5 | 40/60 | 401 | 5000 or more | — | — | — | — | — |
| Ex.8 | polymer 2/polymer 5 | 100/0 | 543 | 1757 | 44 | 2.6 | No adhesion | 0.93 | 47 |
| Ex.9 | polymer 2/polymer 5 | 90/10 | 529 | 2218 | 48 | 2.3 | No adhesion | 0.91 | 56 |
| Ex.10 | polymer 2/polymer 5 | 80/20 | 510 | 4533 | 58 | 1.6 | No adhesion | 0.82 | 71 |
| Ex.11 | polymer 2/polymer 5 | 70/30 | 501 | 5000 or more | 63 | 1.5 | No adhesion | 0.81 | 72 |
| Ex.12 | polymer 2/polymer 5 | 60/40 | 493 | 5000 or more | 67 | 1.3 | No adhesion | 0.80 | 73 |
| Ex.13 | polymer 2/polymer 5 | 50/50 | 478 | 5000 or more | 72 | 1.2 | No adhesion | 0.77 | 75 |
| Ex.14 | polymer 2/polymer 5 | 40/60 | 400 | 5000 or more | — | — | — | — | — |

FIG. 10B

| | Polymer | Mixing ratio | Belt characteristics | | | | | | |
|---|---|---|---|---|---|---|---|---|---|
| | | | Crack occurrence life (hours) | Low temperature running crack occurrence cycle (cycles) | Relative short fiber length (%) | Abration loss (%) | Abration due to adhesion | Noise during running | Tooth part shear strength retention rate (%) |
| Ex.15 | polymer 3/polymer 5 | 100/0 | 536 | 2007 | — | — | — | — | — |
| Ex.16 | polymer 3/polymer 5 | 90/10 | 512 | 2661 | — | — | — | — | — |
| Ex.17 | polymer 3/polymer 5 | 80/20 | 504 | 5000 or more | — | — | — | — | — |
| Ex.18 | polymer 3/polymer 5 | 70/30 | 495 | 5000 or more | — | — | — | — | — |
| Ex.19 | polymer 3/polymer 5 | 60/40 | 473 | 5000 or more | — | — | — | — | — |
| Ex.20 | polymer 3/polymer 5 | 50/50 | 465 | 5000 or more | — | — | — | — | — |
| Ex.21 | polymer 1/polymer 4 | 100/0 | 560 | 1526 | — | — | — | — | — |
| Ex.22 | polymer 1/polymer 4 | 90/10 | 542 | 1746 | — | — | — | — | — |
| Ex.23 | polymer 1/polymer 4 | 80/20 | 524 | 2255 | — | — | — | — | — |
| Ex.24 | polymer 1/polymer 4 | 70/30 | 509 | 4292 | — | — | — | — | — |
| Ex.25 | polymer 1/polymer 4 | 60/40 | 499 | 5000 or more | — | — | — | — | — |
| Ex.26 | polymer 1/polymer 4 | 50/50 | 485 | 5000 or more | — | — | — | — | — |
| Ex.27 | polymer 1/polymer 4 | 30/70 | 389 | 5000 or more | — | — | — | — | — |
| Ex.28 | polymer 1/polymer 4 | 0/100 | 375 | 5000 or more | — | — | — | — | — |
| Ex.29 | polymer 1/polymer 5 | 100/0 | 113 | 2913 | 43 | 2.7 | Large adhesion | 1.00 | 35 |
| Ex.30 | polymer 1/polymer 5 | 90/10 | 105 | 3657 | 48 | 2.4 | Large adhesion | 0.95 | 41 |
| Ex.31 | polymer 2/polymer 5 | 100/0 | 101 | 3248 | 42 | 2.7 | Large adhesion | 0.99 | 36 |
| Ex.32 | polymer 2/polymer 5 | 90/10 | 100 | 4111 | 46 | 2.5 | Large adhesion | 0.96 | 43 |

POWER TRANSMISSION BELT

BACKGROUND OF THE INVENTION

The present invention relates to a power transmission belt using ethylene-á-olefin elastomer as a constructional member of its belt body. More specifically, the present invention relates to a power transmission belt whose body is formed of a rubber composition of ethylene-á-olefin elastomer having an excellent processability (roll processability, tacking ability between rubber sheets, and handling properties of rubber sheets) and that has an excellent running durability.

Examples of industrially used ethylene-á-olefin elastomer include ethylene-propylene copolymer (EPM) and ethylene-propylene-diene terpolymer (EPDM). Such polymer has an excellent heat resistance, cold resistance and ozone resistance, is comparatively inexpensive and allows high filler loading. Furthermore, the polymer puts little load on the environment because it is free from halogen elements, and therefore it is used for many applications such as roofing materials, hoses, gaskets, weather strips and the like.

In General, in the applications for roofing materials or the like, the properties of crack resistance (fatigue resistance), abrasion resistance and low heat generation of a vulcanized rubber composition are not important, because it is used in a static situation where there is no repetition strain. Therefore, the rubber composition used for these applications is generally a blended composition of high filler loading to which oil and filler are blended in a large amount. If this kind of rubber composition is used as it is for an application such as a power transmission belt to which dynamic load is applied, the above properties are extremely poor, so that such a belt cannot be practical with respect to its durability. On the other hand, if a rubber composition of low filler loading containing a large amount of a rubber component is applied, the above properties are improved. However, there is the problem that the processability (the roll processability, the tacking ability between rubber sheets and the handling properties of rubber sheets) of the rubber composition in an unvulcanized state is extremely poor. As in the case of a V-ribbed belt, when a high modulus of elasticity in the traverse direction of the belt and a flexibility in the longitudinal direction of the belt are required, the rubber composition constituting the belt body is generally reinforced with short fibers so that the composition has an anisotropy in the elasticity. However, the processability of the rubber composition in which short fibers are mixed is extremely poor.

SUMMARY OF THE INVENTION

It is an object of the present invention to provide a power transmission belt whose belt body is formed of a rubber composition of ethylene-á-olefin elastomer having an excellent processability and having an excellent running durability.

Moreover, in the present invention, as a raw material rubber of the rubber composition constituting the belt body of the power transmission belt, ethylene-á-olefin elastomer containing a predetermined amount of a high molecular weight component and a low molecular weight component, each of which having a predetermined ethylene content, and having a Mooney viscosity of a predetermined value or less is used.

More specifically, the present invention provides a power transmission belt including a belt body composed of a rubber composition containing ethylene-á-olefin elastomer as a raw material rubber. The ethylene-á-olefin elastomer as the raw material rubber includes 7 to 12 mass % of a high molecular weight component having a molecular weight of $10^6$ or more and an ethylene content of 65 mass % or more, and 26 to 60 mass % of a low molecular weight component having a molecular weight of $10^5$ or less and an ethylene content of 60 mass % or less. The ethylene-á-olefin elastomer has a Mooney viscosity of 50 $ML_{1+4}$ or less (100 C.).

With this embodiment, a constitution distribution of the raw material rubber is appropriate, so that the roll processability, the tacking ability between the rubber sheets and the handling properties of the rubber sheets of the unvulcanized rubber composition before molding the belt are excellent. Furthermore, the running durability of the belt, especially at low temperatures, is more excellent than before.

In other words, if the content of the high molecular weight component having a molecular weight of $10^6$ or more is larger than 12 mass %, the viscosity of the unvulcanized rubber composition before molding into a belt is high and the roll processability and the like are extremely poor. On the other hand, if the content is smaller than 7 mass %, the strength of the unvulcanized rubber composition before molding into a belt is low, so that the rubber is stretched and cut off during molding of a belt. Moreover, the dynamic strength as the vulcanized rubber composition is low after molding of the belt. As a result, the running durability of the belt is extremely poor.

If the content of the low molecular weight component having a molecular weight of $10^5$ or less is larger than 60 mass %, the strength of the unvulcanized rubber composition before molding into a belt is low, so that the rubber is stretched and cut off during molding into a belt. Moreover, the dynamic strength as the vulcanized rubber composition is low after molding of the belt. As a result, the running durability of the belt is extremely poor. On the other hand, if the content is smaller than 26 mass %, the viscosity of the unvulcanized rubber composition before molding into a belt is high, and the roll processability is extremely poor. At the same time, the tacking ability of the unvulcanized rubber composition is low, which makes it difficult to mold into a belt.

If the ethylene content of the high molecular weight component is smaller than 65 mass %, the strength of the unvulcanized rubber composition-before molding into a belt is low and the rubber is stretched and cut off during molding into a belt.

If the ethylene content of the low molecular weight component is larger than 60 mass %, the elastomer increases the crystallinity, the tacking ability of the unvulcanized rubber composition before molding into a belt is low, which makes it difficult to mold into a belt. In addition, the cold resistance of the belt is poor because the belt body is crystallized and becomes rigid at low atmosphere temperatures. In these respects, it is preferable that the ethylene content of the low molecular weight component is 55 mass % or less.

If the Mooney viscosity is higher than 50 $ML_{1+4}$ (100 C.), the roll processability of the unvulcanized rubber composition before molding into a belt is poor, and the tacking ability is low, so that the molding processability of the belt is poor.

Examples of the ethylene-á-olefin elastomer as the raw material rubber include ethylene-propylene copolymer (hereinafter, referred to as "EPM") or ethylene-propylenediene terpolymer (hereinafter, referred to as "EPDM") or ethylene octene copolymer. Among these, EPDM is preferable.

The rubber composition composed of the ethylene-á-olefin elastomer as the raw material rubber may contain short fibers such as nylon fibers, aramid fibers or the like. Since the raw material rubber used in the present invention has a low Mooney viscosity and an excellent rubber flowability, the shear stress applied to the unvulcanized rubber composition during kneading is small and the short fibers are not easily cut off. Therefore, an effect of mixing the short fibers in the rubber composition can be obtained appropriately. For example, if a ribbed rubber layer of the V-ribbed belt is composed thereof, the modulus of elasticity is high in the oriented direction of the short fibers (in the traverse direction of the belt) and the short fibers do not easily fall off while the belt is running. As a result, a loss of the belt caused by abrasion is small, no abrasion due to adhesion occurs and the noise level during running of the belt is low.

Furthermore, examples of power transmission belts of the present invention include V belts, V-ribbed belts, toothed belts and flat belts. In particular, the present invention can be used preferably for V-ribbed belts or toothed belts.

This and other objects and advantages of the present invention will become apparent upon reading and understanding the following detailed description with reference to the accompanying figures.

BRIEF DESCRIPTION OF THE DRAWINGS

FIG. 2 is a table showing raw material rubber properties of polymers 1 to 5.

FIG. 3 is a table showing a blending ratio of a rubber composition made of each of the polymers 1 to 5 as the raw material rubber.

FIGS. 8A and 8B are tables showing raw material rubber properties of Examples 1 to 32.

FIGS. 9A and 9B are tables showing the processability of the unvulcanized rubber compositions of Examples 1 to 32.

FIGS. 10A and 10B are tables showing the belt properties of Examples 1 to 32.

DETAILED DESCRIPTION OF THE INVENTION

Hereinafter, embodiments of the present invention will be described in detail with reference to the accompanying drawings.

Figure 1:
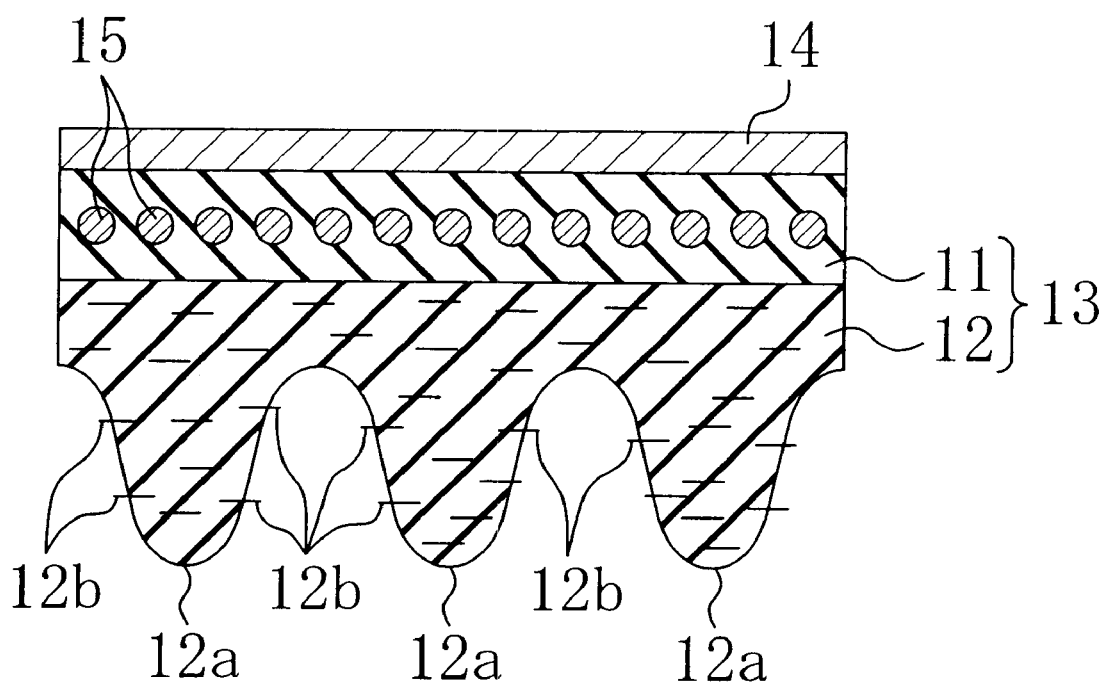
FIG. 1 is a cross section of a V-ribbed belt B according to an embodiment of the present invention.

FIG. 1 shows a V-ribbed belt B according to an embodiment of the present invention. This V-ribbed belt B includes a belt body 13, a back canvas 14 and a plurality of rows of ribs 12a. The belt body 13 includes an adhesive rubber layer 11 and a ribbed-rubber layer 12 underneath the layer 11. The back canvas 14 is attached onto the upper surface of the adhesive rubber layer 11 to constitute the back side of the belt. A plurality of rows of ribs 12a, 12a, 12a are arranged on the lower surface of the ribbed-rubber layer 12 in the traverse direction of the belt at a predetermined interval so that each of the ribs extends in the longitudinal direction of the belt. In the middle of the thickness direction of the adhesive rubber layer 11, cords 15 extending substantially in the longitudinal direction of the belt are spirally provided with being spaced with a pitch in the traverse direction of the belt.

The adhesive rubber layer 11 is composed of an EPDM rubber composition. The EPDM used as the raw material rubber of the composition contains 7 to 12 mass % of a high molecular weight component having a molecular weight of $10^6$ or more and an ethylene content of 65 mass % or more, and 26 to 60 mass % of a low molecular weight component having a molecular weight of $10^5$ or less and an ethylene content of 60 mass % or less. In addition, the EPDM has a Mooney viscosity of 50 $ML_{1+4}$ or less (100 C.).

The ribbed-rubber layer 12 is also composed of an EPDM rubber composition containing the EPDM having the same constitution as in the adhesive rubber layer 11 as a raw material rubber. In order to improve the modulus of elasticity in the traverse direction of the belt, short fibers 12b, 12b . . . such as nylon fibers, aramid fibers or the like oriented in the traverse direction of the belt are mixed in the ribbed-rubber layer 12.

The back side canvas 14 is composed of fabrics such as nylon, cotton or the like and has been subjected to an adhesion treatment with rubber cement or the like in which an adhesive rubber is dissolved in the solvent before molding a belt.

The cords 15 are composed of twisted yarns of polyester fibers, polyethylene-2,6-naphthalate polyethylene fibers, polyvinyl alcohol fibers, aramid fibers or the like and has been subjected to an adhesion treatment with resorcine formalin latex (RFL) or the like before molding a belt.

Such a V-ribbed belt B can be produced by a well-known method for producing belts.

According to the V-ribbed belt B having the above constitution, the constitution distribution of the raw material rubber constituting a belt body 13 is appropriate, the roll processability, the tacking ability between rubber sheets and the handling properties of rubber sheets of the unvulcanized rubber composition before molding into a belt are excellent. Furthermore, the running durability of the belt, especially at low temperatures, is more excellent than before.

Although the ribbed rubber layer 12 contains short fibers 12b, 12b, . . . , since the Mooney viscosity of the raw material rubber is low and the flowability of the rubber is excellent, the shear stress applied to the unvulcanized rubber composition at the time of kneading is small, and therefore short fibers 12b, 12b . . . are not easily cut off. At the same time, the modulus of elasticity of short fibers 12b, 12b . . . in their oriented direction (in the traverse direction of the belt) is high and the short fibers 12b, 12b . . . do not easily fall off when the belt is running. As a result, a loss of the belt caused by abrasion is small, no abrasion due to adhesion occurs and the noise level during running of the belt is small.

In the above-described embodiment, a V-ribbed belt a is taken as an example. However, the present invention is not particularly limited thereto, and a toothed belt, a V belt, a flat belt or the like can be used. In particular, in the case of a toothed belt, a toothed belt provided with teeth having a high shear strength can be obtained. The reason for this is not clear, but it seems that since the unvulcanized rubber composition contains both a high ethylene crystalline component and an amorphous component, and has an excellent flowability, regardless of the difference in the constitution distribution and the crystallinity of the rubber cement used for a coating rubber for the cords or the canvas, the unvulcanized rubber composition exhibits an excellent compatibility with the coating rubber and that the rubber composition adheres tightly to the canvas and to the cords.

In the above-described embodiment, the belt body 13 is composed of EPDM. However, the present invention is not particularly limited thereto, and other kinds of ethylene-á-olefin elastomer such as EPM, ethylene octene copolymer or the like also can be used. In order to widen both the molecular weight distribution and the ethylene content distribution of ethylene-á-olefin elastomer as the raw material rubber of the belt, it is preferable to blend a polymer that has a high molecular weight and a high crystallinity of ethylene, and a polymer that has a low molecular weight and does not have a crystallinity of ethylene such as a liquid polymer. Alternatively, a raw material rubber having the same constitution distribution can be produced by a solution mixing method of mixing the two kinds of rubber solutions described above after solution polymerization and before drying of the solution. Furthermore, also by a two-stage polymerization method, a raw material rubber having the same constitution distribution as that of a mixed solution of the two kinds of polymer described above can be produced.

Test and Evaluation (Samples for Test and Evaluation)

Using EPDM polymers 1 to 5 shown in FIG. 2, the following examples of unvulcanized rubber compositions were prepared, using the composition shown in FIG. 3 as the basic composition

EXAMPLE 1

An unvulcanized rubber composition containing polymer l as the raw material rubber and containing carbon black in a ratio of 50 with respect to 100 of the raw material rubber and oil in a ratio of 10 with respect to 100 of the raw material rubber in the basic composition was prepared as Example 1.

EXAMPLE 2

An unvulcanized rubber composition having the same constitution as that of Example 1 except that a blended composition containing polymer 1 and polymer 5 in a ratio of polymer 1/polymer 5=90/10 was used as the raw material rubber was prepared as Example 2.

EXAMPLE 3

An unvulcanized rubber composition having the same constitution as that of Example 1 except that a blended composition containing polymer 1 and polymer 5 in a ratio of polymer 1/polymer 5=80/20 was used as the raw material rubber was prepared as Example 3.

EXAMPLE 4

An unvulcanized rubber composition having the same constitution as that of Example 1 except that a blended composition containing polymer 1 and polymer 5 in a ratio of polymer 1/polymer 5=70/30 was used as the raw material rubber was prepared as Example 4.

EXAMPLE 5

An unvulcanized rubber composition having the same constitution as that of Example 1 except that a blended composition containing polymer 1 and polymer 5 in a ratio of polymer 1/polymer 5=60/40 was used as the raw material rubber was prepared as Example 5.

EXAMPLE 6

An unvulcanized rubber composition having the same constitution as that of Example 1 except that a blended composition containing polymer 1 and polymer 5 in a ratio of polymer 1/polymer 5=50/50 was used as the raw material rubber was prepared as Example 6.

EXAMPLE 7

An unvulcanized rubber composition having the same constitution as that of Example 1 except that a blended composition containing polymer 1 and polymer 5 in a ratio of polymer 1/polymer 5=40/60 was used as the raw material rubber was prepared as Example 7.

EXAMPLE 8

An unvulcanized rubber composition having the same constitution as that of Example 1 except that polymer 2 was used as the raw material rubber was prepared as Example 8.

EXAMPLE 9

An unvulcanized rubber composition having the same constitution as that of Example 1 except that a blended composition containing polymer 2 and polymer 5 in a ratio of polymer 2/polymer 5=90/10 was used as the raw material rubber was prepared as Example 9.

EXAMPLE 10

An unvulcanized rubber composition having the same constitution as that of Example 1 except that a blended composition containing polymer 2 and polymer 5 in a ratio of polymer 2/polymer 5=80/20 was used as the raw material rubber was prepared as Example 10.

EXAMPLE 11

An unvulcanized rubber composition having the same constitution as that of Example 1 except that a blended composition containing polymer 2 and polymer 5 in a ratio of polymer 2/polymer 5=70/30 was used as the raw material rubber was prepared as Example 11.

EXAMPLE 12

An unvulcanized rubber composition having the same constitution as that of Example 1 except that a blended composition containing polymer 2 and polymer 5 in a ratio of polymer 2/polymer 5=60/40 was used as the raw material rubber was prepared as Example 12.

EXAMPLE 13

An unvulcanized rubber composition having the same constitution as that of Example 1 except that a blended composition containing polymer 2 and polymer 5 in a ratio of polymer 2/polymer 5=50/50 was used as the raw material rubber was prepared as Example 13.

EXAMPLE 14

An unvulcanized rubber composition having the same constitution as that of Example 1 except that a blended composition containing polymer 2 and polymer 5 in a ratio of polymer 2/polymer 5=40/60 was used as the raw material rubber was prepared as Example 14.

EXAMPLE 15

An unvulcanized rubber composition having the same constitution as that of Example 1 except that polymer 3 was used as the raw material rubber was prepared as Example 15.

EXAMPLE 16

An unvulcanized rubber composition having the same constitution as that of Example 1 except that a blended composition containing polymer 3 and polymer 5 in a ratio of polymer 3/polymer 5=90/10 was used as the raw material rubber was prepared as Example 16.

EXAMPLE 17

An unvulcanized rubber composition having the same constitution as that of Example 1 except that a blended composition containing polymer 3 and polymer 5 in a ratio of polymer 3/polymer 5=80/20 was used as the raw material rubber was prepared as Example 17.

EXAMPLE 18

An unvulcanized rubber composition having the same constitution as that of Example 1 except that a blended composition containing polymer 3 and polymer 5 in a ratio of polymer 3/polymer 5=70/30 was used as the raw material rubber was prepared as Example 18.

EXAMPLE 19

An unvulcanized rubber composition having the same constitution as that of Example 1 except that a blended composition containing polymer 3 and polymer 5 in a ratio of polymer 3/polymer 5=60/40 was used as the raw material rubber was prepared as Example 19.

EXAMPLE 20

An unvulcanized rubber composition having the same constitution as that of Example 1 except that a blended composition containing polymer 3 and polymer 5 in a ratio of polymer 3/polymer 5=50/50 was used as the raw material rubber was prepared as Example 20.

EXAMPLE 21

An unvulcanized rubber composition having the same constitution as that of Example 1 was prepared anew as Example 21.

EXAMPLE 22

An unvulcanized rubber composition having the same constitution as that of Example 1 except that a blended composition containing polymer 1 and polymer 4 in a ratio of polymer 1/polymer 4=90/10 was used as the raw material rubber was prepared as Example 22.

EXAMPLE 23

An unvulcanized rubber composition having the same constitution as that of Example 1 except that a blended composition containing polymer 1 and polymer 4 in a ratio of polymer 1/polymer 4=80/20 was used as the raw material rubber was prepared as Example 23.

EXAMPLE 24

An unvulcanized rubber composition having the same constitution as that of Example 1 except that a blended composition containing polymer 1 and polymer 4 in a ratio of polymer 1/polymer 4=70/30 was used as the raw material rubber was prepared as Example 24.

EXAMPLE 25

An unvulcanized rubber composition having the same constitution as that of Example 1 except that a blended composition containing polymer 1 and polymer 4 in a ratio of polymer 1/polymer 4=60/40 was used as the raw material rubber was prepared as Example 25.

EXAMPLE 26

An unvulcanized rubber composition having the same constitution as that of Example 1 except that a blended composition containing polymer 1 and polymer 4 in a ratio of polymer 1/polymer 4=50/50 was used as the raw material rubber was prepared as Example 26.

EXAMPLE 27

An unvulcanized rubber composition having the same constitution as that of Example 1 except that a blended composition containing polymer 1 and polymer 4 in a ratio of polymer 1/polymer 4=30/70 was used as the raw material rubber was prepared as Example 27.

EXAMPLE 28

An unvulcanized rubber composition having the same constitution as that of Example 1 except that polymer 4 was used as the raw material rubber was prepared as Example 28.

EXAMPLE 29

An unvulcanized rubber composition having the same constitution as that of Example 1 except for containing carbon black in a ratio of 100 with respect to 100 of the raw material rubber and oil in a ratio of 30 with respect to 100 of the raw material rubber in the basic composition was prepared as Example 29.

EXAMPLE 30

An unvulcanized rubber composition having the same constitution as that of Example 2 except for containing carbon black in a ratio of 100 with respect to 100 of the raw material rubber and oil in a ratio of 30 with respect to 100 of the raw material rubber in the basic composition was prepared as Example 30.

EXAMPLE 31

An unvulcanized rubber composition having the same constitution as that of Example 8 except for containing carbon-black in a ratio of 100 with respect to 100 of the raw material rubber and oil in a ratio of 30 with respect to 100 of the raw material rubber was prepared as Example 31.

EXAMPLE 32

An unvulcanized rubber composition having the same constitution as that of Example 9 except for containing carbon black in a ratio of 100 with respect to 100 of the raw material rubber and oil in a ratio of 30 with respect to 100 of the raw material rubber was prepared as Example 32.

Method for Test and Evaluation <Evaluation of Raw Material Rubbers>

Molecular Weight Distribution

The molecular weight distribution of a raw material rubber used for each of the unvulcanized rubber compositions of Examples 1 to 32 was determined by gel permeation chromatography (GPC).

First, using a standard polystyrene whose molecular weight is already known, a calibration curve of a correlation diagram between the molecular weight and the elution volume was made. In this case, the concentration of polystyrene was 0.02 mass %.

Next, samples of each raw material rubber were prepared for GPC analysis. More specifically, each raw material rubber was dissolved in O-dichlorobenzene so that the concentration became 0.1 mass %, and to this solution, 0.1 mass % of 2,6-di-tert-butyl-P-cresol as an antioxidant were added. Thereafter, the solution was heated to 135° C. until the raw material rubber was completely dissolved.

Then, the prepared sample solution of each raw material rubber was set in a GPC analyzing device (manufactured by WATERS Corporation 150C) and a GPC pattern of each raw material rubber was taken by the GPC analysis. The column used in this analysis was of a high-temperature type, and the total theoretical plate number of the column was 10000 to 20000. As for the sample solution used for measurement, the amount was 0.5 ml, the temperature at measurement was 135° C. and the flow rate was 1 ml/min.

Then, according to the calibration curve of a correlation diagram between the molecular weight and the elution volume of standard polystyrenes whose molecular weights are known, the weight average molecular weight (Mw) of each raw material rubber in terms of polystyrene was calculated.

Figure 4:
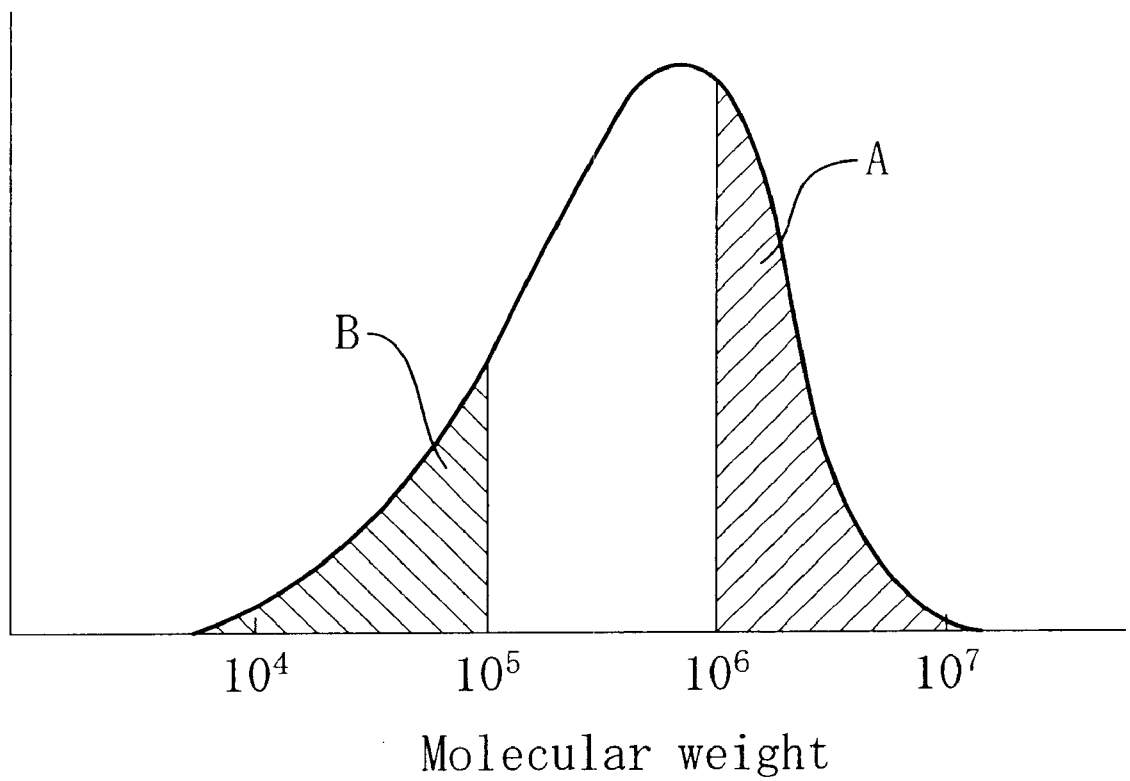
FIG. 4 is a graph of a molecular weight distribution curve of a raw material rubber.

Thereafter, the component amounts of a high molecular weight component having a molecular weight of $10^6$ or more and a low molecular weight component having a molecular weight of $10^5$ or less contained in each raw material rubber were calculated. FIG. 4 schematically shows a molecular weight distribution curve calculated by the calibration curve of a correlation diagram obtained by the above-described method and by the GPC pattern of the raw material rubbers. As shown in FIG. 4, according to the molecular weight distribution curve of each raw material rubber, area A where the molecular weight is $10^6$ or more and area B where the molecular weight is $10^5$ or less were respectively calculated, and the percentages of area A and B with respect to the total area of the distribution curve were respectively obtained as the component amounts of respective components (see the following formulae).

The component amount of a high molecular weight component having a molecular weight of $10^6$ or more (%)=A/total area of distribution curve×100

The component amount of a low molecular weight component having a molecular weight of $10^5$ or less (%)=B/total area of distribution curve×100

Mooney Viscosity

The Mooney viscosity of raw material rubbers used for each of the unvulcanized rubber compositions of Examples 1 to 32 was measured according to JIS K6300, with a L-type roller at 100°, at a preheating time of 1 minute and a rotation time of 4 minutes. <Evaluation of Processability of Unvulcanized Rubber Compositions>

Test and evaluations of the roll processability, the tacking ability between rubber sheets at the time of molding and the handling properties of rubber sheets were performed for each of the unvulcanized rubber compositions of Examples 1 to 32.

Roll Processability

First, 10-inch rolls (rotation ratio: front roll/back roll=1/1.15) were used. The temperature of the rolls was set to 80° C. and the roll interval was set to 5 mm. The unvulcanized rubber composition heated to 100° was fed into the rolls and according to the behavior of the unvulcanized rubber composition at that time, roll processability was classified as follows. The rubber that rolled on the roll spontaneously without bagging was classified as "Good". The rubber that did not roll on the roll with bagging at a roll interval of 5 mm but rolled on the roll without bagging at a roll interval of 3 mm was classified as "Fair". The rubber that did not roll on the roll with bagging even at a roll interval of 3 mm was classified as "poor".

Tacking Ability Between Molded Rubber Sheets

Each of the unvulcanized rubber compositions of Examples 1 to 32 was processed into rubber sheets, and according to the behavior of the rubber sheets when rolling them on a mandrel, the tacking ability between rubber sheets at the molding was classified as follows. The rubber sheets that remained adhered only by adding pressure at the end of the rolling process and were easy to mold were classified as "Good". The rubber sheets that were not adhered even by adding pressure at the end of the rolling process and were difficult to mold were classified as "poor".

Handling Properties of Rubber Sheets

According to the behavior of the rubber sheets composed of unvulcanized rubber compositions when rolling them on a mandrel for molding a belt, the handling properties of the rubber sheets were classified as follows. The rubber sheets that stretched little at the molding of the belt and were not damaged were classified as "Good". The rubber sheets that showed ununiformity in the thickness due to the stretches of the rubber sheets at the molding of the belt and were partially damaged were classified as "Poor".

<Evaluation of Belts>

Evaluation of a V-ribbed Belt

V-ribbed belts, each of which has a ribbed-rubber layer composed of each of the unvulcanized rubber compositions of Examples 1 to 32, were produced. A canvas of the belt was made of nylon fibers and cords of the belt were made of polyester fibers.

Figure 5:
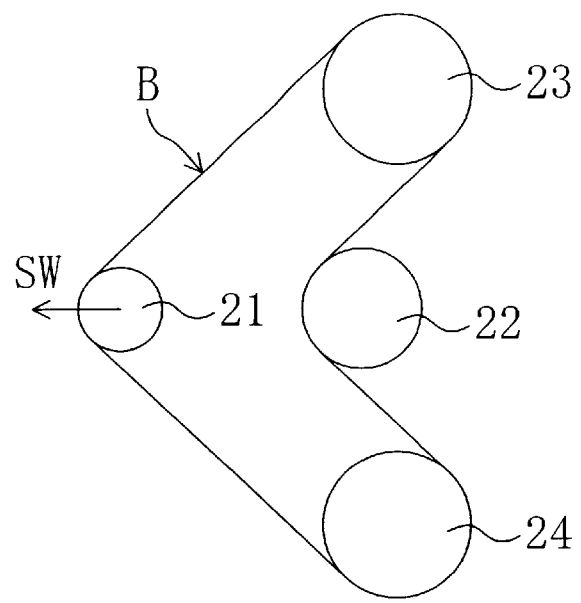
FIG. 5 is a layout chart of a running durability testing machine of a V-ribbed belt.

Each V-ribbed belt was suspended in a belt running testing machine in a layout as shown in FIG. 5 and was operated to run, and a test and evaluation of running durability was performed. For the test, the atmosphere temperature was set to 120° C. The rotation speed of a pulley 23 was 4900 rpm and as for a pulley 24, a load of 2 kw was applied to each rib of the belt. Furthermore, a set weight was added to a pulley 21 so that a load of 277 N is applied to each rib of the belt. The material for pulleys 21, 22, 23 and 24 was all S45C, and the diameter of the pulley 21 was 55 mm, the diameter of the pulley 22 was 70 mm and the diameter of the pulleys 23 and 24 was 120 mm. The angle formed by the belt at the pulleys 21 and 22 was 90°. Then, the crack occurrence life, which is a duration from the start of running until the time when a crack appeared on the rib surface was measured (observed by regularly stopping the running).

In addition, as for Examples 1 to 6, 8 to 13 and 29 to 32, the following test and evaluation was also performed.

A microscopic observation was performed on the surface of the rib of each V-ribbed belt before the running test, and the percentage of the maximum length of observed short fibers with respect to the original length of short fibers was calculated as a relative length of short fibers.

The mass of the belt was measured when 24 hours had passed since the belt started running. The percentage of the loss of the mass from the mass before running was calculated.

According to the state of the surface of the rib 24 hours after the start of the running, abrasion due to adhesion was classified as follows. The belt that showed no abrasion due to adhesion was classified as "No Adhesion". The belt in which adhesive powder adhered to only one portion was classified as "Minimal Adhesion". The belt in which granular abraded powder adhered to several portions on the bottom of the ribs of the belt was classified as "Small Adhesion". The belt adhered with granular abraded powder lining in rows was classified as "Medium Adhesion". The belt with ribs whose bottoms were mostly covered with laminated adhesive abraded powder lining in rows was classified as "Large Adhesion".

The noise level near the pulley 23 5 hours after the start of the running was measured as a sound pressure value at a frequency of 6000 Hz with a noise meter. Since an actual measurement value of the sound pressure level depends on the setting position of a microphone and the plane roughness of the pulley, the belt of Example 29 was used as the reference belt and the percentage with respect to the sound pressure value of the reference belt at running was calculated.

Figure 6:
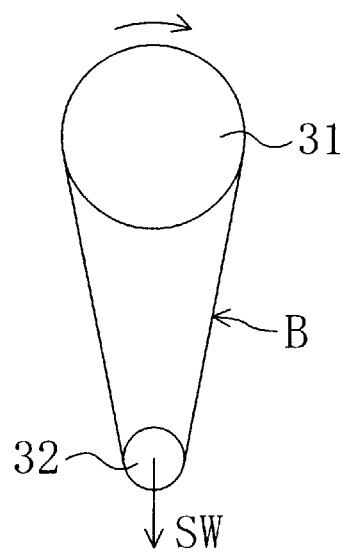
FIG. 6 is a layout chart of a running durability testing machine of a V-ribbed belt at a low temperature.

Then, a test and evaluation of the running performance at a low temperature-was performed after the V-ribbed belts of Examples 1 to 32 were suspended around a large pulley 31 and a small pulley 32 in the layout shown in FIG. 6 and were operated to run. The atmosphere temperature was set to −40° C. The rotation speed of the large pulley 31 was 270 rpm and the small pulley 32 was put under no load. Furthermore, the small pulley 32 was loaded with a set weight so that a load of 9.8 N was applied to each of the ribs. The material of the large pulley 31 and the small pulley 32 was both S45C and the diameter of the large pulley 31 was 140 mm and the diameter of the small pulley 32 was 45 mm. An operation in which belt running was continued for 5 minutes and then stopped for 25 minutes constitutes 1 cycle and the number of cycles until a crack appeared was measured with observation.

Evaluation of a Toothed Belt

Standard STS S8M Type toothed belts with a width of 19 mm including belt bodies composed of the unvulcanized rubber compositions of Examples 1 to 6, 8 to 13 and 29 to 32 were produced.

Figure 7:
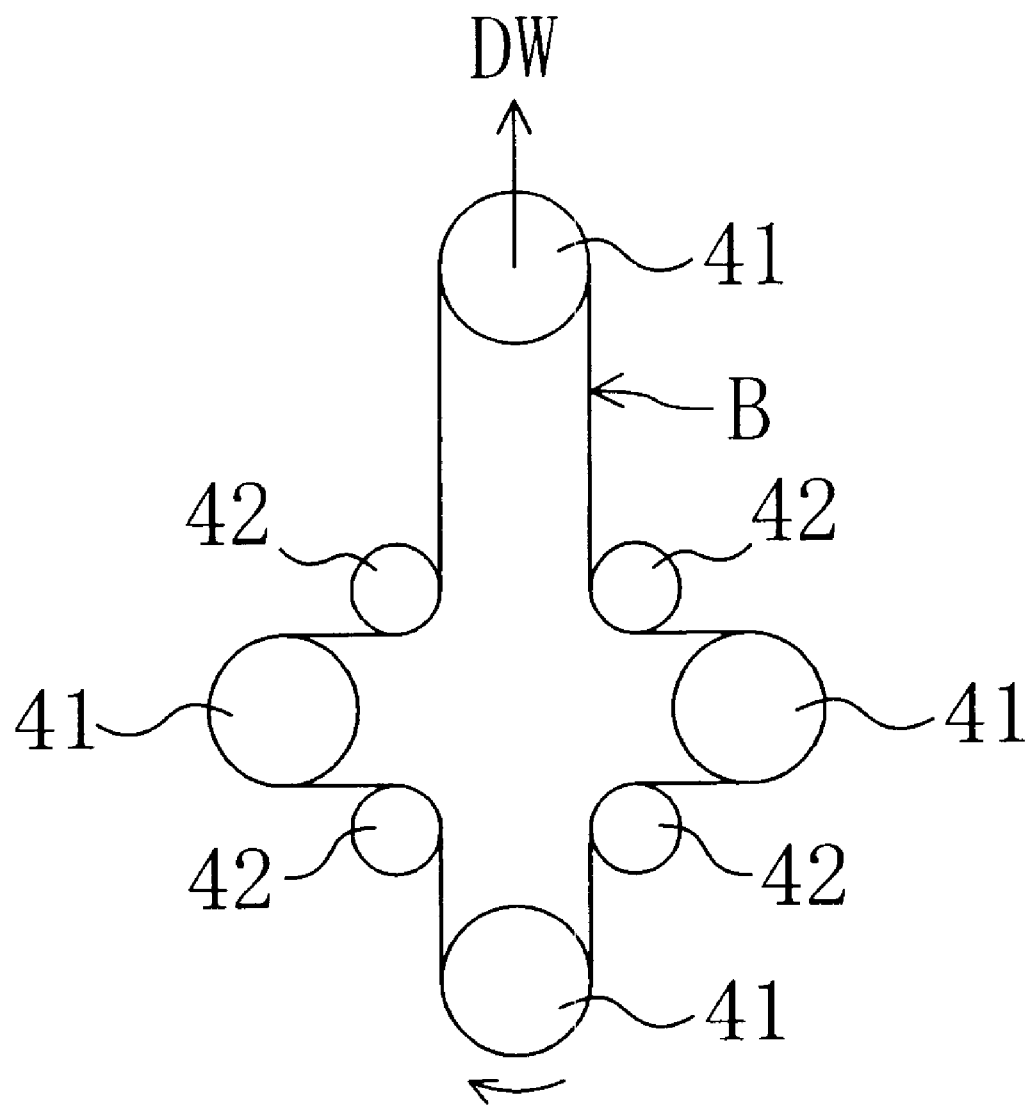
FIG. 7 is a layout chart of a running testing machine of a toothed belt.

A test and evaluation of a tooth part was performed, regarding its shear strength retention property after each toothed belt was suspended around 4 toothed-pulleys 41, 41, . . . and 4 idler pulleys 42, 42, . . . of a running testing machine of the belt in the layout shown in FIG. 7 and was operated to run. The atmosphere temperature was set to 25° C. The rotation speed of the lowest toothed pulley 41 was 5500 rpm and the other pulleys 41 and 42 were put under no load. Furthermore, the highest pulley 41 was loaded with a dead weight so that a load of 392 N was applied to the belt. The material of pulleys 41 and 42 was all S45C and the diameter of the toothed pulleys 41 was 59.78 mm (the number of teeth was 24) and the diameter of the idler pulleys 42 was 28 mm. Then, the running of the belt was continued until the belt was bent $1 \times 10^8$ times. In this test, the belt was bent 4 times per rotation around the layout of the running testing machine. Then, a shear deformation was caused to one of the teeth of a toothed belt that had been bent $1 \times 10^8$ times and also to one of the teeth of a toothed belt that was not operated to run. A load value when the tooth was damaged was used as a shear strength of the tooth part, and the percentage of the shear strength of the tooth part of the toothed belt that was bent $1 \times 10^8$ times with respect to that of the belt that was not operated to run was determined as a shear strength retention rate of the belt.

Results of Test and Evaluation

The results of the test and evaluation are shown in FIGS. 8A, 8B, 9A, 9B, 10A and 10B.

According to these figures, Examples 3 to 6 and 10 to 13 are excellent in all the aspects in that the crack occurrence life is 450 hours or more and the number of cycles at crack appearance at low temperatures is 4000 cycles or more, and the processability of the rubber compositions is excellent. All the raw material rubbers of these examples have the feature that 7 to 12 mass % of a high molecular weight component having a molecular weight of $10^6$ or more and an ethylene content of 65 mass % or more, and 26 to 60 mass % of a low molecular weight component having a molecular weight of $10^5$ or less and an ethylene content of 60 mass % or less is contained and that the Mooney viscosity is 50 $ML_{1+4}$ or less (100° C.).

In Examples 1, 2, 8 and 9, since the content of the high molecular weight component is large and that of the low molecular weight component is small in the raw material rubber, the roll processability and the tacking ability between the rubber sheets of the unvulcanized rubber compositions are not sufficient.

In Examples 7 and 14, since the content of the high molecular weight component is small and that of the low molecular weight component is large in the raw material rubber, the handling properties of the rubber sheets of the unvulcanized rubber compositions are poor and the crack occurrence life is short, and therefore, the running durability is poor.

In Examples 15 to 20, the ethylene content in the high molecular weight component in the raw material rubbers is small. In Examples 15 and 16 having a large content of the high molecular weight component, the roll processability and the tacking ability between the rubber sheets are poor. On the other hand, in Examples 17, 18, 19 and 20 having a large content of the low molecular weight component, the handling properties of the rubber sheets are poor.

In Examples 21 and 22, since the content of the low molecular weight component in the raw material rubber is small and an ethylene content in the low molecular weight component is large, the roll processability and the tacking ability between the rubber sheets of the unvulcanized rubber compositions are poor and the running performance of the belt at a low temperature is also poor.

In Examples 23 to 28, since the content of the low molecular weight component in the raw material rubber is small and the ethylene content in the high molecular weight component is also small, the roll processability, the tacking ability between the rubber sheets at the molding and the handling properties of the rubber sheets cannot be satisfied at the same time.

Examples 29 to 32 are obtained by increasing the amount of carbon black and oil in order to improve the processability of Examples 1, 2, 8 and 9. It is clear that in Examples 1, 2, 8 and 9, in comparison with Examples 29 to 32, the processability of the unvulcanized rubber compositions is poor as described above, and as for the belt properties, although the running durability and the resistance against abrasion due to adhesion are excellent, the running performance at a low temperature is extremely poor and the resistance against abrasion is poor because a relative length of short fibers is small and the noise level at the running of the belt is comparatively high. In addition, it is also clear that the shear strength retention rate of the tooth part of the toothed belt is low. On the other hand, in Examples 29 to 32, since the carbon black amount and the oil amount are large, the processability of the unvulcanized rubber compositions and the running performance of the belt at a low tempertature are improved. However, the running durability of the belt (the crack occurrence life) and the resistance against abrasion are extremely poor, and a large abrasion due to adhesion is observed and the noise level during running of the belt is also high. Moreover, as in Examples 1, 2, 8 and 9, the shear strength retention rate of the tooth part of the toothed belt is low.

On the contrary, in Examples 3 to 6 and 10 to 13, it is evident that the processability of the unvulcanized rubber compositions is excellent and the running durability and the running performance at a low temperature of the V-ribbed belt are excellent. At the same time, since the Mooney viscosity is low and the flowability of the rubber is excellent, the shear stress applied to the unvulcanized rubber compositions during kneading is small and short fibers are not easily cut off and the relative length of short fibers is large. Therefore, even if the same amount of short fibers is mixed in the belt, the modulus of elasticity of short fibers in the direction to which the short fibers are oriented (in the traverse direction of the belt) is higher and the short fibers do not easily fall off while the belt is running. As a result, a loss of the belt caused by abrasion is small, no abrasion due to adhesion occurs and the noise level during running of the belt is small.

In the case of the toothed belt, it is also evident that the belt body composed of the unvulcanized rubber compositions of Examples 3 to 6 and 10 to 13 exhibits a high shear strength retention rate in its tooth part. This seems to be because, since the unvulcanized rubber composition contains both a high ethylene crystalline component and an amorphous component, and has an excellent flowability, regardless of the difference in the constitution distribution and the crystallinity of ethylene-á-olefin elastomer of the rubber cement used for a coating rubber for the cords or the canvas, the unvulcanized rubber composition shows an excellent compatibility with the coating rubber and that the rubber composition adheres tightly to the canvas and to the cords. As a result, the durability of the teeth of the belt is improved.

As described above, Examples 3 to 6 and 10 to 13 are excellent both in the processability of the unvulcanized rubber compositions and the belt properties. All of these examples are combinations of highly crystalline rubbers (polymer 1, polymer 2) having an ethylene content of 65 mass % or more and a high molecular weight (high Mooney viscosity) and amorphous liquid rubbers (manufactured by Uniroyal Chemical Company. Inc., Trilene67) having a low ethylene content of 40.7 wt % and a low molecular weight. In other words, in order to widen both the molecular weight distribution and the ethylene content distribution of ethylene-á-olefin elastomer as the raw material rubber of the belt, it is effective to blend a rubber that has a high molecular weight and a high crystallinity of ethylene and a rubber that has a low molecular weight and does not have a crystallinity of ethylene such as a liquid polymer. Alternatively, a raw material rubber having the same constitution distribution can be produced by a solution mixing method of mixing the two kinds of rubber solutions described above after solution polymerization and before drying of the solution. Furthermore, also by a two-stage polymerization method, a raw material rubber having the same constitution distribution as that of a mixed solution of the two kinds of polymer described above can be produced.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A power transmission belt including a belt body composed of a rubber composition comprising ethylene-á-olefin elastomer as a raw material rubber, wherein the ethylene-á-olefin elastomer as the raw material rubber comprises 7 to 12 mass % of a high molecular weight component having a molecular weight of $10^6$ or more and an ethylene content of 65 mass % or more, and 26 to 60 mass % of a low molecular weight component having a molecular weight of $10^5$ or less and an ethylene content of 60 mass % or less, and the ethylene-á-olefin elastomer has a Mooney viscosity of 50 $ML_{1+4}$ or less (100 C.).

2. The power transmission belt according to claim 1, wherein the ethylene-á-olefin elastomer is ethylene-propylene copolymer (EPM) or ethylene-propylene-diene terpolymer (EPDM) or ethylene-octene copolymer.

3. The power transmission belt according to claim 1, wherein the rubber composition comprising the ethylene-á-olefin elastomer as the raw material rubber contains short fibers.

4. The power transmission belt according to claim 1, wherein the belt body is a V-ribbed belt body in which a plurality of rows of ribs extending in a longitudinal direction of the belt are arranged in a traverse direction of the belt at a predetermined pitch.

5. The power transmission belt according to claim 1, wherein the belt body is a toothed belt body.

* * * * *

UNITED STATES PATENT AND TRADEMARK OFFICE
CERTIFICATE OF CORRECTION

PATENT NO. : 6,511,394 B2
DATED : January 28, 2003
INVENTOR(S) : Shigeki Okuno et al.

It is certified that error appears in the above-identified patent and that said Letters Patent is hereby corrected as shown below:

<u>Title page,</u>
Item [57], ABSTRACT,
Lines 2 and 3, change "ethylene-á-olefin" to -- ethylene-α-olefin --;
Line 9, change "ethylene-é-olefin" to -- ethylene-α-olefin --;

<u>Column 1,</u>
Lines 7, 10, 14, 55 and 60, change "ethylene-á-olefin" to -- ethylene-α-olefin --;

<u>Column 2,</u>
Lines 1, 2, 8 and 65, change "ethylene-á-olefin" to -- ethylene-α-olefin --;

<u>Column 3,</u>
Line 5, change "ethylene-á-olefin" to -- ethylene-α-olefin --;

<u>Column 5,</u>
Lines 11 and 14, change "ethylene-á-olefin" to -- ethylene-α-olefin --;

<u>Column 13,</u>
Lines 33 and 51, change "ethylene-á-olefin" to -- ethylene-α-olefin --;

<u>Column 14,</u>
Lines 23, 26, 33, 36 and 41, change "ethylene-á-olefin" to -- ethylene-α-olefin --;

Signed and Sealed this

Twenty-ninth Day of June, 2004

JON W. DUDAS
*Acting Director of the United States Patent and Trademark Office*